United States Patent
Bae et al.

(10) Patent No.: US 9,466,119 B2
(45) Date of Patent: Oct. 11, 2016

(54) METHOD AND APPARATUS FOR DETECTING POSTURE OF SURVEILLANCE CAMERA

(71) Applicant: Hanwha Techwin Co., Ltd., Changwon-si (KR)

(72) Inventors: Soon Min Bae, Changwon (KR); Seung In Noh, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 363 days.

(21) Appl. No.: 14/132,186

(22) Filed: Dec. 18, 2013

(65) Prior Publication Data

US 2015/0049185 A1   Feb. 19, 2015

(30) Foreign Application Priority Data

Aug. 13, 2013   (KR) .................. 10-2013-0096115

(51) Int. Cl.
| | | |
|---|---|---|
| G01B 11/26 | (2006.01) | |
| G06T 7/20 | (2006.01) | |
| G01B 11/00 | (2006.01) | |
| G06T 7/00 | (2006.01) | |

(52) U.S. Cl.
CPC .............. *G06T 7/20* (2013.01); *G01B 11/002* (2013.01); *G06T 7/0042* (2013.01); *G06T 2207/30232* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 8,103,126 | B2* | 1/2012 | Hayashi | H04N 5/2226 348/218.1 |
| 2007/0024704 | A1 | 2/2007 | Lin et al. | |
| 2010/0066515 | A1 | 3/2010 | Shimazaki et al. | |
| 2010/0103266 | A1 | 4/2010 | Merkel et al. | |
| 2010/0201814 | A1 | 8/2010 | Zhang et al. | |
| 2010/0295948 | A1* | 11/2010 | Xie | G06T 7/0018 348/175 |
| 2011/0115912 | A1* | 5/2011 | Kuehnle | G06K 9/00798 348/148 |

FOREIGN PATENT DOCUMENTS

| | | |
|---|---|---|
| JP | 2002-008012 A | 1/2002 |
| JP | 2008-132014 A | 6/2008 |
| JP | 2009-200691 A | 9/2009 |
| KR | 10-2009-0096736 A | 9/2009 |

* cited by examiner

*Primary Examiner* — Sath V Perungavoor
*Assistant Examiner* — Janese Duley
(74) *Attorney, Agent, or Firm* — Sughrue Mion, PLLC

(57) ABSTRACT

Provided is a method and apparatus of detecting a posture of a camera such as a surveillance or monitoring camera. The method includes acquiring an image captured by the camera, acquiring ground information about the ground in the image based on the image, and detecting the posture of the camera based on the ground information.

13 Claims, 5 Drawing Sheets

METHOD AND APPARATUS FOR DETECTING POSTURE OF SURVEILLANCE CAMERA

CROSS REFERENCE TO RELATED APPLICATION

This application claims priority from Korean Patent Application No. 10-2013-0096115, filed on Aug. 13, 2013, in the Korean Intellectual Property Office, the disclosure of which is incorporated herein in its entirety by reference.

BACKGROUND

1. Field

One or more embodiments of the inventive concept relate to a method and apparatus for detecting a posture of a surveillance camera, and more particularly, to a method and apparatus for detecting the posture of a surveillance camera based on image analysis.

2. Description of the Related Art

Surveillance systems using surveillance cameras are widely used for monitoring access to buildings or facilities and preventing crimes.

Pan-tilt-zoom (PTZ) cameras have vertically and horizontally rotatable supports and zoom lenses for magnifying images. PTZ cameras can be rotated horizontally 360 degrees (panning) and vertically 180 degrees (tilting) to monitor a wide area. PTZ cameras may include panning motors and tilting motors for panning and tilting motions.

PTZ cameras can take images of objects at desired magnifications by using adjustable zoom lenses. Since various areas can be photographed using PTZ cameras, many surveillance systems use PTZ cameras. Images of surveillance areas may be captured with fixed or movable surveillance cameras.

When surveillance systems detect or sort moving objects, information such as the installation heights, positions, and photographing angles of cameras may be important for analyzing the objects. To this end, it is necessary to detect the positions and postures of cameras.

For example, Korean Patent Application Publication No. 2009-0062019, entitled "METHOD AND DEVICE TO CALIBRATE CAMERA HEAD USING GPS SYSTEM", discloses a technique for displaying a photographing direction of a camera by acquiring three-dimensional positions of at least two global positioning system (GPS) receivers and obtaining information about the direction of the camera from the acquired positional information of GPS receivers.

SUMMARY

One or more embodiments provide a method and apparatus for detecting a posture of a camera such as a surveillance camera or monitoring camera. Various aspects will be set forth in part in the description which follows and, in part, will be apparent from the description, or may be learned by practice of the presented embodiments.

According to an aspect of an exemplary embodiment, there is provided a method of detecting a posture of a camera, the method including: acquiring an image captured by the camera; acquiring ground information about the ground in the image based on the image; and detecting the posture of the camera based on the ground information.

The ground information may include information about a position of the horizon in the image.

The posture of the surveillance camera may include a tilting angle of the camera corresponding to a vertical angle of the camera, and the detecting the posture of the camera may include detecting the tilting angle of the camera based on the position of the horizon.

The acquiring the ground information may include: detecting a first object and a second object from the image; detecting first and second feature points of the first object and first and second feature points of the second object; detecting an intersection between a first extension line and a second extension line, the first extension line connecting the first feature points of the first and second objects, the second extension line connecting the second feature points of the first and second objects; and acquiring information about the position of the horizon based on the intersection.

The detecting the first and second objects may be performed by detecting the first object from a first frame of the image and detecting the second object from a second frame of the image, wherein the first and second frames are captured by the camera at different times.

The detecting the first and second objects may be performed by tracing the first object in the first frame and detecting the first object traced in the second frame as the second object.

The first object may be detected using a motion detecting method.

The detecting the first and second objects may be performed by a feature recognition method based on same feature values.

The detecting the first and second objects, the detecting the first and second feature points, and the detecting the intersection may be repeated a plurality of times, and the acquiring the information about the position of the horizon may be performed using a plurality of intersections obtained by the repetition.

The acquiring the information about the position of the horizon may include: detecting linear edges from the image; and acquiring information about the position of the horizon by selecting at least one of the edges depending on the intersection and considering the selected edge.

The acquiring the information of the position of the horizon may be performed by considering one of the edges closest to the intersection.

The camera may be operated in a top-view mode to capture images of an area from an upper side of the area or in a side-view mode to capture images of the area from a lateral side of the area, and the detecting the posture of the camera may be performed by detecting a posture of the camera corresponding to the top-view mode or side-view mode of the camera.

The acquiring the ground information may include: detecting a movement line of a moving object in the image; and acquiring the ground information based on a direction of the detected movement line.

The detecting the movement line may be repeated a plurality of times to detect a plurality of movement lines, and the acquiring the ground information may further include analyzing the movement lines to determine whether the movement lines have directivity, wherein if the movement lines are determined as having no directivity, the posture of the camera may be determined to be in a posture corresponding to the top-view mode, and if the movement lines are determined as having directivity, the posture of the camera may be determined to be in a posture corresponding to the side-view mode.

According to an aspect of another exemplary embodiment, there is provided an apparatus for detecting a posture of a camera, the apparatus including: an image acquisition unit configured to acquire an image captured by the camera coupled to a vertically-rotatable tilting unit; a ground information acquisition unit configured to acquire information about the ground in the image; and a posture detection unit configured to detect the posture of the camera based on the ground information.

The ground information acquisition unit may include: an object detection part configured to detect a first object and a second object from the image; a feature-point detection part configured to detect first and second feature points from the first object and first and second feature points from the second object; an intersection detection part configured to detect an intersection between a first extension line and a second extension line, the first extension line connecting the first feature points of the first and second objects, and the second extension line connecting the second feature points of the first and second objects; and a horizon acquisition part configured to acquire information about a position of the horizon in the image based on the intersection.

The ground information acquisition unit may further include an edge detection part configured to detect linear edges from the image, wherein the horizon acquisition part may acquire the information about the position of the horizon by selecting at least one of the edges based on distances between the edges and the intersection and considering the selected edge.

The camera may be operated in a top-view mode to capture images of an area from an upper side of the area or in a side-view mode to capture images of the area from a lateral side of the area. The ground information acquisition unit may include a movement line detection part configured to detect a movement line of a moving object in the image, and the posture detection unit may detect a posture of the camera corresponding to one of the top-view mode and the side-view mode based on a direction of the movement line.

The movement line detection part may detect a plurality of movement lines, and the ground information acquisition unit may further include a directivity detection part configured to analyze the movement lines to determine whether the movement lines have directivity, wherein if the movement lines are determined as having no directivity, the posture detection unit may determine the posture of the camera as a posture corresponding to the top-view mode, and if the movement lines are determined as having directivity, the posture detection unit may determine the posture of the camera as a posture corresponding to the side-view mode.

Other features, characteristics, advantages of the inventive concept will be clearly understood from the drawings, claims, and description. The general and specific features of the inventive concept may be embodied as systems, methods, computer programs, or combinations thereof.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

Figure 1:
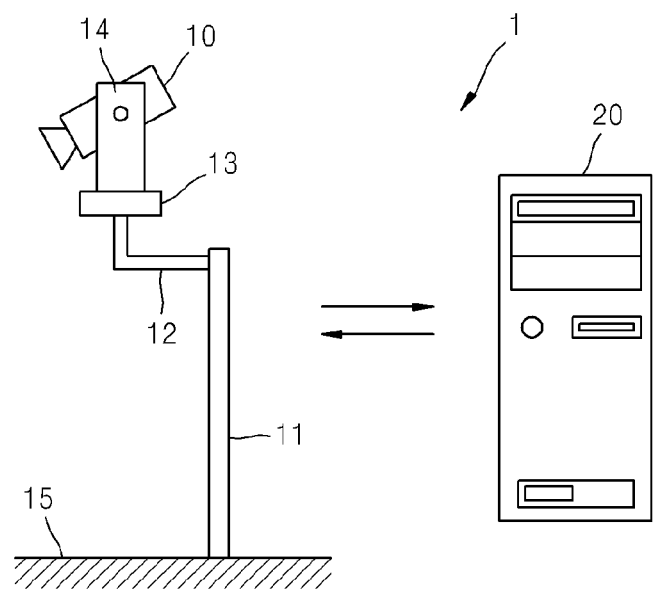
FIG. 1 is a view illustrating a surveillance system according to an exemplary embodiment.

Reference will now be made in detail to exemplary embodiments, which are illustrated in the accompanying drawings. In this regard, the present embodiments may have different forms and should not be construed as being limited to the descriptions set forth herein. Accordingly, the embodiments are merely described below, by referring to the figures, to explain aspects of the present description.

In the drawings, like reference numerals denote like elements, and overlapping descriptions thereof will be omitted.

In the following descriptions of the embodiments, although the terms first and second are used to describe various elements, these elements should not be limited by these terms. These terms are only used to distinguish one element from another element.

In the following descriptions of the embodiments, the terms of a singular form may include plural forms unless referred to the contrary.

In the following descriptions of the embodiments, the meaning of "include", "comprise", "including", or "comprising" specifies a property, a region, a fixed number, a step, a process, an element and/or a component but does not exclude other properties, regions, fixed numbers, steps, processes, elements.

In the drawings, the sizes of elements may be exaggerated for clarity. For example, in the drawings, the size or thickness of each element may be arbitrarily shown for illustrative purpose, and thus the present invention should not be construed as being limited thereto.

FIG. 1 is a view illustrating a surveillance system 1 according to an exemplary embodiment. Referring to FIG. 1, the surveillance system 1 may include a camera 10 for surveillance and a computer 20, and data may be transmitted between the camera 10 and the computer 20.

The camera 10 may be a pan-tilt-zoom (PTZ) camera having panning, tilting, and zooming functions and disposed in a certain area for surveillance. In this case, the camera 10 may capture images while the camera 10 is being rotated by at least one of panning and tilting and/or a zoom ratio is being changed. The camera 10 may be fixed to a certain position. However, the embodiments are not limited thereto. For example, the camera 10 may be moved using a device to which the camera 10 is fixed.

The camera 10 is connected to a tilting unit 14 and a panning unit 13. The tilting unit 14 may vertically rotate the camera 10. The panning unit 13 may horizontally rotate the camera 10. The camera 10 is connected through a connection unit 12 to a support 11 fixed to the ground 15. The connection unit 12 may be configured to adjust the height of the camera 10. For example, the position of the camera 10 may vary vertically and horizontally by extending the connection unit 12.

In the current embodiment, the camera 10 may have a plurality of capture modes. The camera 10 may capture images in different capture modes according to postures of the camera 10. For example, the camera 10 may capture images of a surveillance area in a top-view mode or a side-view mode. The camera 10 may operate in the top-view mode or the side-view mode according to the tilting angle thereof. For example, an angle between the ground 15 and a photographing direction of the camera 10 may be about 90 degrees in the top-view mode and about 30 degrees in the side-view mode. In another example, the angle between the ground 15 and the photographing direction of the camera 10 may be greater than a reference angle in the top-view mode and equal to or less than the reference angle in the side-view mode.

Explanations of the capture modes of the camera 10, images captured in different capture modes of the camera 10, and information about the ground 15 in images will now be given with reference to FIGS. 4 to 7.

Figure 4:
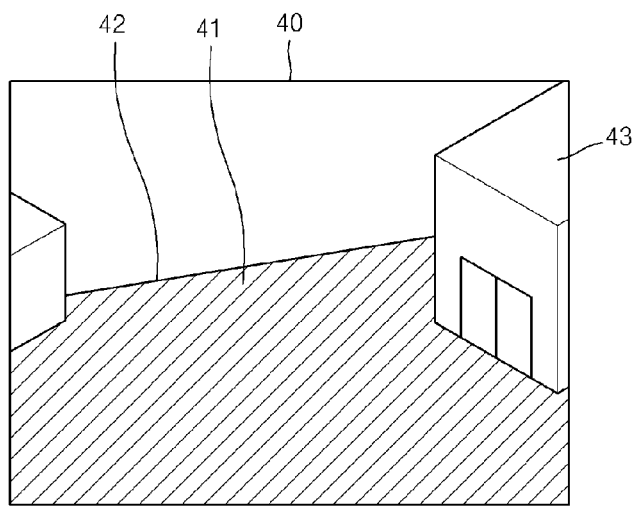
FIG. 4 shows an exemplary image captured using a camera.

FIG. 4 is an exemplary image 40 captured using the camera 10. In detail, the image 40 is captured in the side-view mode. The image 40 includes a ground 41 and a building 43 on the ground 41. The horizon 42 of the ground 41 is shown in the image 40. Since the image 40 is taken in the side-view mode, the horizon 42 is shown in the middle of the image 40.

Figure 5:
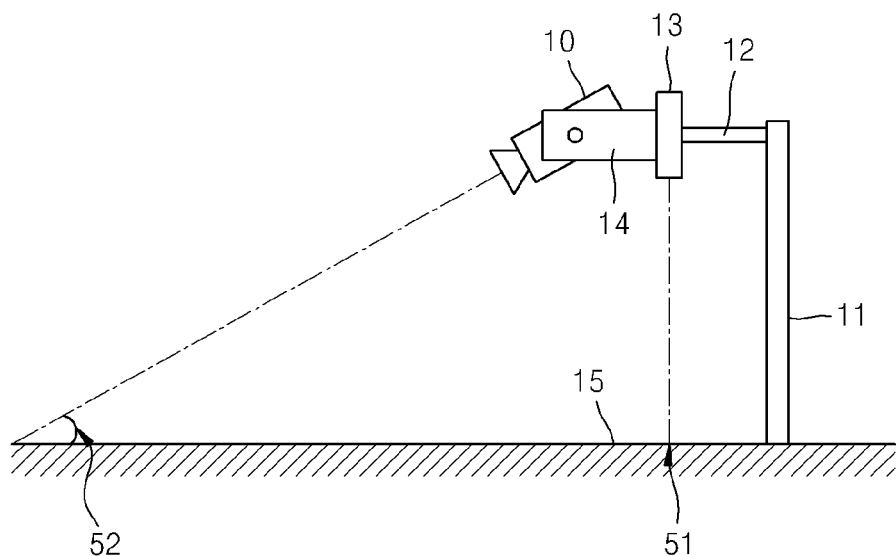
FIG. 5 is a view illustrating an exemplary posture of the camera.

FIG. 5 is a view illustrating an exemplary posture of the camera 10. In detail, FIG. 5 illustrates the camera 10 put into the top-view mode. Referring to FIG. 5, the vertical angle of the camera 10 may be adjusted using the tilting unit 14. For example, the angle (52) between the ground 15 and the photographing direction of the camera 10 may be adjusted to a value less than 90 degrees to operate the camera 10 in the side-view mode. The connection unit 12 connecting the support 11 and the camera 10 may be configured to adjust the height and position 51 of the camera 10.

Figure 6:
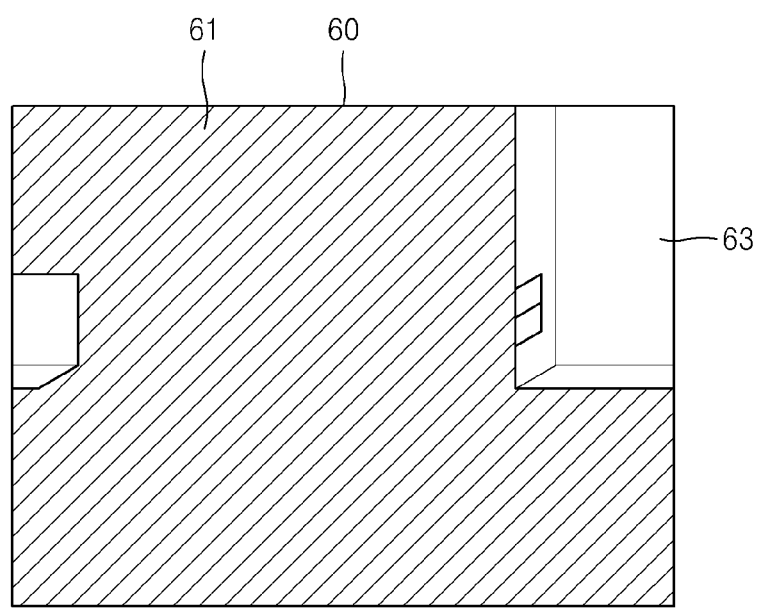
FIG. 6 shows another exemplary image captured using the camera.

FIG. 6 shows another exemplary image 60 captured using the camera 10. In detail, FIG. 6 shows an exemplary image 60 captured in the top-view mode. The image 40 includes the ground 61 and a building 63 on the ground 61. Since the image 60 is captured in the top-view mode, the horizon 42 is not shown in the image 60.

Figure 7:
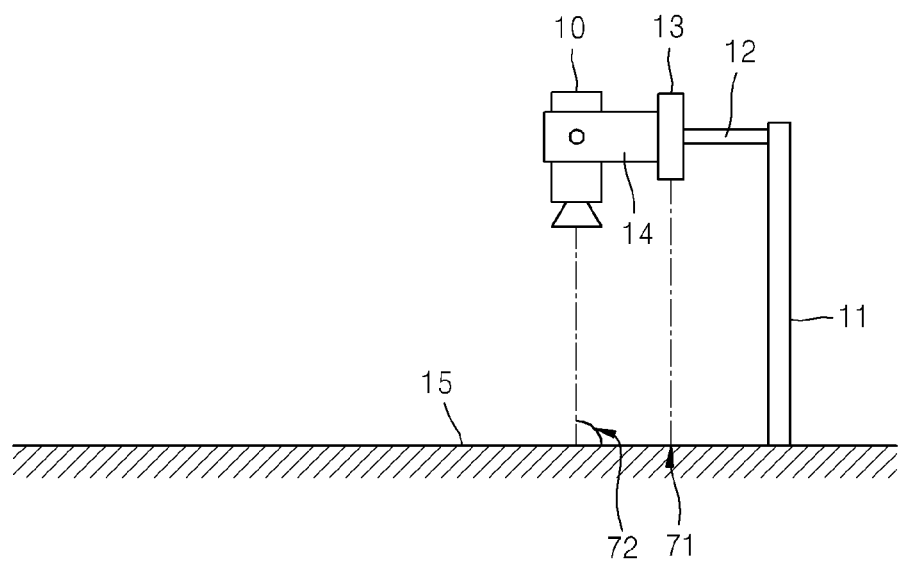
FIG. 7 is a view illustrating another exemplary posture of the camera.

FIG. 7 is a view illustrating another exemplary posture of the camera 10. In detail, FIG. 7 illustrates the camera 10 put into the top-view mode. Referring to FIG. 7, the vertical angle of the camera 10 may be adjusted using the tilting unit 14. For example, the angle (72) between the ground 15 and the photographing direction of the camera 10 may be adjusted to about 90 degrees to operate the camera 10 in the top-view mode. The connection unit 12 connecting the support 11 and the camera 10 may be configured to adjust the height and position 71 of the camera 10, as described with reference to FIG. 5.

The angle (72) in the top-view mode may not be 90 degrees. That is, the angle (72) may vary in other embodiments. Only a few examples of the top-view mode and the side-view mode are illustrated in FIGS. 4 to 7. However, more top-view modes and side-view modes may be achieved according to the tilting angle of the camera 10. For example, the top-view mode and the side-view mode may be defined based on a reference angle. The reference angle may be 90 degrees but is not limited thereto. Depending on the purpose of photographing, various capture modes may be defined according to reference angles. For example, various reference angles such as 80 degrees and 70 degrees may be used.

Referring to FIG. 1, the camera 10 may transmit image signals to the computer 20. The camera 10 may be connected to a network and transmit image signals to the computer 20 through the network. However, the embodiments are not limited thereto.

The camera 10 includes a processor to receive and analyze images captured by the camera 10. For example, the computer 20 may include a posture detecting device to detect the posture of the camera 10 such as the panning angle and tilting angle of the camera 10, as described with reference to FIG. 2.

Figure 2:
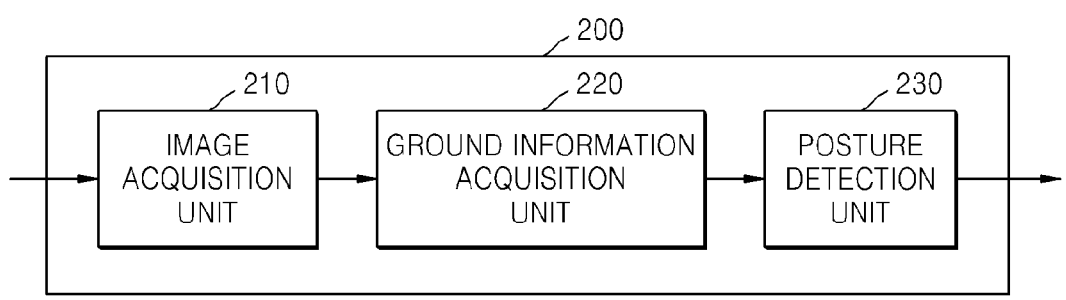
FIG. 2 is a view schematically illustrating a configuration of a posture detecting device of a surveillance camera, according to an exemplary embodiment.

FIG. 2 is a view schematically illustrating a configuration of a posture detecting device 200 of the camera 10, according to an exemplary embodiment. Referring to FIG. 2, the posture detecting device 200 includes an image acquisition unit 210, a ground information acquisition unit 220, and a posture detection unit 230.

The image acquisition unit 210 receives images of a surveillance area from the camera 10. For example, if the camera 10 is a PTZ camera, the image acquisition unit 210 may receive images captured by zooming and/or rotating the camera 10 in horizontal and/or vertical directions of a surveillance area.

The ground information acquisition unit 220 extracts ground information from an image acquired by the image acquisition unit 210. The ground information may be information about a position of the ground in the image. For example, the ground information may indicate an area which is determined as the ground. The ground information may include information about the position of the horizon in the image. For example, the information about the position of the horizon may include coordinates of the horizon or parameters of components of the horizon.

The horizon is the intersection of the sky and earth. The horizon may not be seen in the image. For example, in an image, the horizon may be blocked by an object and thus may not be seen. Although the horizon is not present in the image, information about the position of the horizon may be obtained.

The posture detection unit 230 detects a posture of the camera 10 based on the ground information acquired by the ground information acquisition unit 220. For example, the posture detection unit 230 may detect a panning angle, a tilting angle, or a height of the camera 10. The panning angle is a horizontal angle of the camera 10, and the tilting angle is a vertical angle of the camera 10.

For example, the posture detection unit 230 may detect the tilting angle of the camera 10 based on the position of the horizon. For example, the higher is the position of the horizon in the image, the larger is the angle between a photographing direction of the camera 10 and the ground. That is, the tilting angle of the camera 10 becomes large. On the contrary, if the height of the horizon is low in the image, the photographing direction of the camera 10 is pointed away from the ground. That is, the tilting angle of the camera 10 is small. Herein, the tilting angle means the angle between the ground and the photographing direction of the camera 10.

The posture of the camera 10, such as the tilting angle of the camera 10, may correspond to the capture mode of the camera 10. For example, a tilting angle range of the camera 10 that is greater than a reference angle may correspond to the top-view mode, and a titling angle range of the camera 10 that is not greater than the reference angle may correspond to the side-view mode. In this way, the posture detection unit 230 may detect the posture of the camera 10 by determining whether the camera 10 is in the top-view mode or the side-view mode. Whether the camera 10 is in the top-view mode or the side-view mode may be determined using information about the position of the horizon in the image.

Simply, if the horizon exists in the image, the posture detection unit 230 may determine that the camera 10 is in the side-view mode; however, if the horizon does not exist in the image, the posture detection unit 230 may determine that the camera 10 is in the top-view mode. Herein, the statement "the horizon exists in an image" does not always mean that the horizon can be seen in the image. For example, although the horizon exists in an image, the horizon may not be seen because the horizon is blocked by other objects.

After the tilting angle of the camera 10 is detected, the height of the camera 10 may be calculated using trigonometric functions and a distance between the camera 10 and an object in the image. For example, the distance from the camera 10 to an object may be calculated using an actual size of the object, the size of the object in the image, and a zoom ratio of a lens of the camera 10. The actual size of the object may be previously stored. For example, after detecting an object whose actual size and shape are known, the distance from the camera 10 to the object may be calculated using the actual size of the object, the size of the object in the image, and the lens zoom ratio.

The posture detection unit 230 may receive at least one parameter and calculate the posture of the camera 10 by using the parameter. The parameter may be ground information. The parameter may include a focal length of a lens of the camera 10. For example, the posture detection unit 230 may detect the tilting angle of the camera 10 based on the focal length of the lens and information about the horizon.

The information about the horizon may include coordinates of pixels corresponding to the horizon. However, the embodiments are not limited thereto. For example, the information about the horizon may be expressed by at least one parameter specifying the horizon. For example, when the horizon is expressed by a straight line, the information about the horizon may be the equation of the straight line or parameters of the equation of the straight line.

Figure 3:
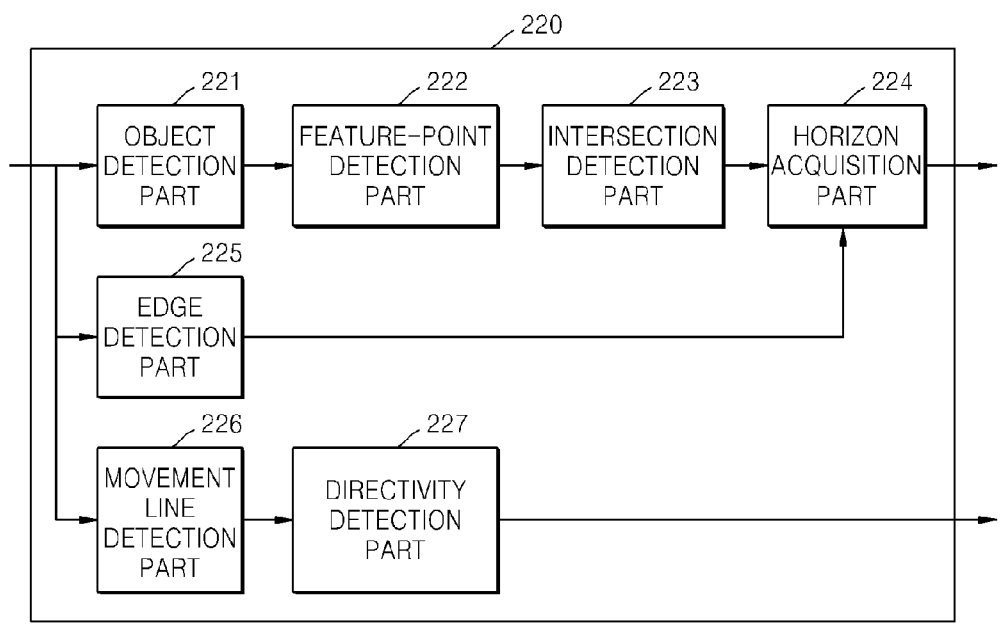
FIG. 3 is a view illustrating a configuration of a ground information acquisition unit according to an exemplary embodiment.

FIG. 3 is a view illustrating the configuration of the ground information acquisition unit 220 according to an exemplary embodiment. Referring to FIG. 3, the ground information acquisition unit 220 includes an object detection part 221, a feature-point detection part 222, an intersection detection part 223, and a horizon acquisition part 224. The object detection part 221 detects a plurality of objects from an image acquired by the image acquisition unit 210. The feature-point detection part 222 detects feature points of each object. The intersection detection part 223 detects intersections between lines extending from the feature points of each object. The horizon acquisition part 224 acquires information about the horizon from the intersections.

Figure 8:
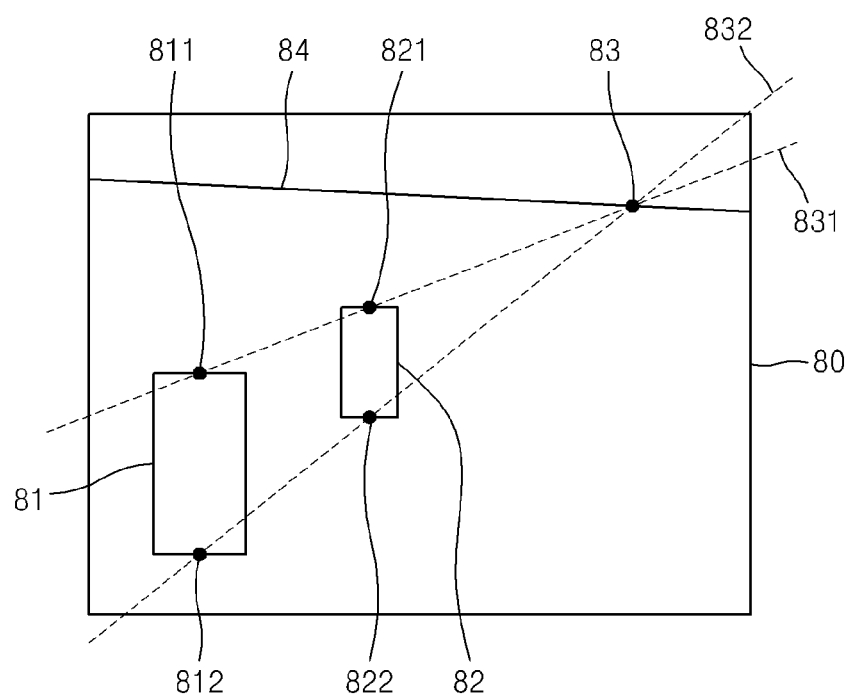
FIG. 8 is a view illustrating acquiring information about the position of the horizon by using the ground information acquisition unit, according to an exemplary embodiment.

With reference to FIG. 8, an explanation will be given of an example of acquiring information about the horizon by using the object detection part 221, the feature-point detection part 222, the intersection detection part 223, and the horizon acquisition part 224.

FIG. 8 is a view illustrating acquiring information on the horizon by using the ground information acquisition unit 220, according to an exemplary embodiment.

The object detection part 221 illustrated in FIG. 3 detects a plurality of objects from an image 80 acquired by the image acquisition unit 210. For example, the object detection part 221 detects a first object 81 and a second object 82 from the image 80.

At this time, an object having a particular shape may be detected from the image 80 by using a feature recognition method. For example, a person may be detected as an object. In another example, an automobile may be detected as an object. The feature recognition method uses feature values of a shape such as histograms of oriented gradients (HOG). However, the embodiments of the feature recognition method are not limited thereto.

When a plurality of objects are detected, although the sizes of the objects present in the image are different, it may be assumed that the actual sizes of the objects are equal, and previously stored values may be used as the actual sizes of the objects.

For example, in the current embodiment, the first and second objects 81 and 82 may be identical. The image 80 shown in FIG. 8 may include a plurality of frames that are superimposed on top of one another. For example, the first object 81 may be detected from a first frame, and the second object 82 may be detected from a second frame that is captured at a time different from the time at which the first frame is captured.

A moving object may be detected. For example, the first object 81 of the first frame may be a moving object, and when the second frame is captured, the first object 81 may be detected as the second object 82 in the second frame. The first object 81 may be detected and traced using a motion detecting method. In detail, the first object 81 may be traced until the second frame is captured and detected as the second object 82 from the second frame.

In other embodiments, the first and second objects 81 and 82 may be different. The image 80 shown in FIG. 8 may include only a single frame, and the first and second objects 81 and 82 may be detected from the single frame. The object detection part 221 may detect the first and second objects 81 and 82 by a feature recognition method based on the same feature values.

In this case, whether an object moves or not is not considered. For example, each of the first and second objects 81 and 82 may be a moving or fixed object. However, regardless of that, the first and second objects 81 and 82 are detected by a feature recognition method based on the feature values of the same reference shape. For example, if the reference shape is a human shape, the first and second objects 81 and 82 may be different persons, and if the reference shape is an automobile shape, the first and second objects 81 and 82 may be different automobiles. Although the first and second objects 81 and 82 have different sizes in the image 80, it may be assumed that the first and second objects 81 and 82 have the same actual size.

The feature-point detection part 222 detects feature points of an object detected by the object detection part 221. An object may have a plurality of feature points. For example, the feature-point detection part 222 may detect first and second feature points 811 and 812 from the first object 81, and first and second feature points 821 and 822 from the second object 82. The first feature points 811 and 821 may be coordinates of the upper ends of the first and second objects 81 and 82, and the second feature points 812 and 822 may be coordinates of the lower ends of the first and second objects 81 and 82. For example, the first feature points 811 and 821 may be the coordinates of the uppermost pixels of the first and second objects 81 and 82 (that is, the maximum y-coordinates of the pixels of the first and second objects 81 and 82), and the second feature points 812 and 822 may be the coordinates of the lowermost pixels of the first and second objects 81 and 82 (that is, the minimum y-coordinates of the pixels of the first and second objects 81 and 82). The embodiments of the feature point setting method are not limited thereto.

The intersection detection part 223 detects intersections of lines extending from feature points of each object. For example, a first extension line 831 connects the first feature point 811 of the first object 81 and the first feature point 821 of the second object 82, and a second extension line 832 connects the second feature point 812 of the first object 81 and the second feature point 822 of the second object 82. Then, the intersection detection part 223 may detect an intersection 83 of the first extension line 831 and the second extension line 832.

If it is assumed that two objects have the same actual size, an extension line connecting first feature points of the two objects intersects with an extension line connecting second feature points of the two objects when the two objects have difference sizes in an image. In other words, the two objects may have different coordinates in the direction of depth of an image in a three-dimensional coordinate system. As described above, when two objects having the same actual size and placed at close and distant positions are seen as having different sizes in a planar image due to a sense of perspective, an extension line connecting the upper ends of the two objects intersects at the horizon with an extension line connecting the lower ends of the two objects.

The horizon acquisition part 224 may acquire information about the horizon 84 based on the intersection 83 detected by the intersection detection part 223.

The intersection detection part 223 may detect a plurality of intersections. For example, the object detection part 221 may detect at least two sets of objects, and the feature-point detection part 222 may detect feature points of the at least two sets of objects. Then, the intersection detection part 223 may detect at least two intersections. The horizon acquisition part 224 may acquire information about the horizon 84 from the plurality of intersections. For example, the horizon acquisition part 224 may extract components of a line from a plurality of intersections and may acquire information about the horizon 84 based on the extracted components.

The horizon acquisition part 224 may output a signal indicating information about the horizon 84. Examples of information about the horizon 84 include those explained with reference to FIG. 2. Information about the horizon 84 may be included in ground information and output to the posture detection unit 230.

Referring back to FIG. 3, the ground information acquisition unit 220 may further include an edge detection part 225. The edge detection part 225 detects linear edges from an image. For example, the edge detection part 225 may detect edges using a homogeneity operator or a difference operator.

In the above-described embodiments, the feature points of the objects detected from the image are analyzed, and the horizon is extracted based on intersections. If edge information is used in addition to that, the horizon may be detected more precisely.

The edge detection part 225 may detect a plurality of edges. The detected edges include various lines present in the image as well as the horizon. Therefore, one of the edges corresponding to the horizon may be selected. For example, the horizon acquisition part 224 may select at least one of the edges detected by the edge detection part 225 based on the intersections detected by the intersection detection part 223.

For example, the horizon acquisition part 224 may select one of the edges which is closest to an intersection detected by the intersection detection part 223 and may acquire information about the horizon from the selected edge. In another example, the horizon acquisition part 224 may compare a plurality of edges with components of a line extracted from a plurality of intersections by the intersection detection part 223. Then, the horizon acquisition part 224 may select one of the edges that is most similar to the components of the line and may acquire information about the horizon from the selected edge. The comparison may be performed using various data-similarity-determining methods.

The horizon acquisition part 224 may acquire information about the horizon after additionally considering the selected edge.

Referring to FIG. 3, the ground information acquisition unit 220 may further include a movement line detection part 226 and a directivity detection part 227.

The movement line detection part 226 detects a movement line of a moving object in an image. The moving object is detected by a motion detecting method. The movement line detection part 226 may detect a plurality of movement lines by repeating detection of a movement line of a moving object. The movement line detection part 226 may detect a sufficient number of movement lines for precise analysis of movement lines.

The directivity detection part 227 analyzes the movement lines detected by the movement line detection part 226 to determine whether the movement lines have directivity. If the movement lines have directivity, a sum of direction components of the movement lines may result in a particular direction component. If the movement lines have no directivity, the sum of movement lines (vectors) may be zero or negligibly small.

The directivity detection part 227 outputs a result of directivity detection. Alternatively, the directivity detection part 227 may output ground information obtained based on the result of directivity detection.

The posture detection unit 230 detects the posture of the camera 10 based on the result of directivity detection. For example, if a plurality of movement lines radially arranged are detected, it may be determined that the movement lines have no directivity, meaning that the object moves arbitrarily (that is, the object does not move in a particular direction). In this case, a possibility that the object is photographed in the top-view mode is high. On the contrary, if the movement lines have directivity, the object may move in a particular direction. In this case, the possibility that the object is photographed in the side-view mode is high.

Therefore, if the directivity detection part 227 detects no directivity, the posture detection unit 230 determines the posture of the camera 10 as a posture that corresponds to the top-view mode, and if the directivity detection part 227 detects directivity, the posture detection unit 230 determines the posture of the camera 10 as a posture that corresponds to the side-view mode.

Figure 9:
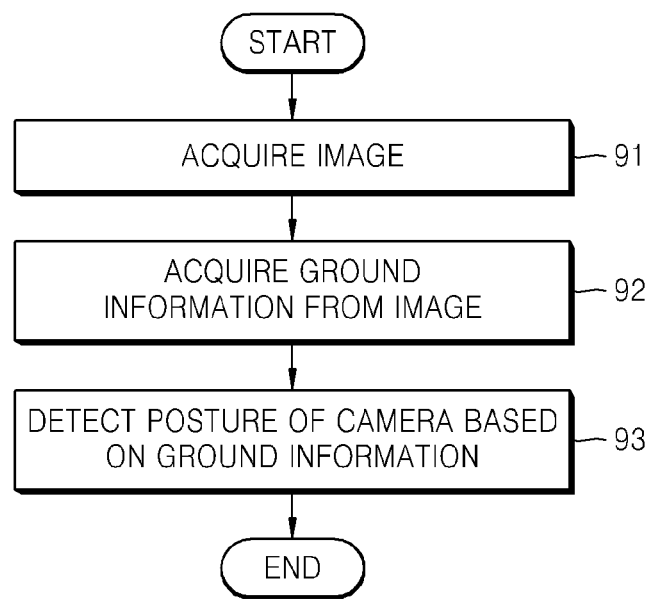
FIG. 9 is a flowchart of a method of detecting the posture of a surveillance camera, according to an exemplary embodiment.

FIG. 9 is a flowchart of a method of detecting the posture of a surveillance camera, according to an exemplary embodiment. Referring to FIG. 9, the flowchart shows sequential operations performed by the posture detecting device 200 illustrated in FIG. 2. The above descriptions of the units illustrated in FIG. 2 may be applied to the method described below with reference to the flowchart of FIG. 9 although the descriptions are not repeated. In addition, the descriptions given with reference to FIGS. 3 to 8 may also be applied to the method described below with reference to FIG. 9.

Referring to FIG. 9, in operation 91, the image acquisition unit 210 acquires an image from a surveillance camera.

In operation 92, the ground information acquisition unit 220 acquires ground information from the image acquired in operation 91. The ground information includes information about the position of the horizon in the image.

According to an exemplary embodiment, in operation 92, the ground information acquisition unit 220 detects first and second objects in the image, first and second feature points of the first object, first and second feature points of the second object, and an intersection between first and second extension lines. Here, the first extension line connects the first feature points of the first and second objects, and the second extension line connects the second feature points of the first and second objects. Then, the ground information acquisition unit 220 acquires information about the horizon based on the intersection.

The first object may be detected from a first frame of the image, and the second object may be detected from a second frame of the image. The first and second frames may be captured at different times. Here, the first object and the second object may be the same object of which images are captured at the different times.

For example, in operation 92, the first and second objects may be detected by a feature recognition method based on the same feature values. In operation 92, the ground information acquisition unit 220 may repeat object detection, feature value detection, and intersection detection to detect a plurality of intersections and acquire information about the position of the horizon based on the plurality of intersections. For example, in operation 92, the ground information acquisition unit 220 may detect a plurality of linear edges from the image and may select one of the edges based on the result of intersection detection to acquire information about the position of the horizon after additionally considering the selected edge. The edge selection may be performed by selecting one of edges that is closest to an intersection.

In another example, the first object may be detected using a motion detecting method. In this case, the first object may be traced and detected in a second frame as a second object.

According to another exemplary embodiment, in operation 92, the ground information acquisition unit 220 may detect a movement line of a moving object in an image and may acquire and/or provide ground information based on the direction of the movement line. The ground information acquisition unit 220 may detect a plurality of movement lines. In this case, in operation 92, the ground information acquisition unit 220 may determine whether the movement lines have directivity and may acquire and/or provide ground information based on the determination result.

In operation 93, the posture detection unit 230 detects the posture of the camera based on the ground information. The posture of the camera detected in operation 93 includes the tilting angle (vertical angle) of the camera. In operation 93, the posture detection unit 230 may detect the tilting angle of the camera after considering the position of the horizon. The posture of the camera may correspond to the capture mode of the camera.

If the directivity of movement lines is acquired as ground information in operation 92, the posture detection unit 230 may determine the capture mode of the camera according to the directivity of movement lines, and may detect the posture of the camera based on the determined capture mode. For example, if it is detected that the movement lines have no directivity, the posture detection unit 230 may detect the posture of the camera as a posture corresponding to the top-view mode, and if it is detected that the movement lines have directivity, the posture detection unit 230 may detect the posture of the camera as a posture corresponding to the side-view mode.

The posture detecting method of the current embodiment explained with reference to FIG. 9 can be written as computer programs and can be implemented in general-use digital computers that execute the programs using a computer-readable recording medium. Examples of the computer-readable recording medium include magnetic storage media (e.g., read-only memory (ROM), floppy disks, hard disks, etc.) and optical recording media (e.g., compact disc (CD)-ROMs, or digital versatile discs (DVDs)). At least one of the units and/or parts illustrated in FIGS. 2 and 3 may represent a module, a program, or a part of code, which contains one or more executable instructions for performing a corresponding logic function or operation as described above. It should also be noted that at least one of these units and/or parts may be implemented by a dedicated hardware-based system for performing functions or operations, by a software-based system for performing the corresponding logic function or operation, or by a combination of dedicated hardware and computer instructions.

In the above-described embodiments, the posture detection unit 230 detects the posture of a camera based on the ground information. The ground information is acquired by the ground information acquisition unit 220. According to the above-described embodiments, the ground information includes various kinds of information such as information about the position of the horizon. The posture detection unit 230 may use previously prepared lookup tables or interaction formulas to generate output data based on various kinds of information and parameters.

In addition, the posture detection unit 230 may define a relationship between the posture of a camera and the ground information using various data mining methods. Then, the posture detection unit 230 may detect the posture of the camera based on the relationship.

According to the camera posture detecting method and apparatus of the above-described embodiments, the posture of a camera can be detected based on image analysis without using any additional device.

According to the camera posture detecting method and apparatus of the above-described embodiments, the posture of a camera can be automatically detected based on image analysis, and thus it is unnecessary for a user to manually input image information to detect the posture of the camera.

As described above, according to the one or more of the above embodiments, the posture of a camera can be automatically detected based on image analysis without requiring any additional device or manual input of image information.

It should be understood that the exemplary embodiments described above should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the inventive concept as defined by the following claims.

What is claimed is:

1. A method of detecting a posture of a camera, the method comprising:
   acquiring an image captured by the camera;
   acquiring ground information about the ground in the image based on the image; and
   detecting the posture of the camera based on the ground information,
   wherein the acquiring the ground information comprises:
      detecting a first object and a second object from the image;
      detecting an intersection between a first extension line and a second extension line, the first extension line connecting first corresponding feature points between the first and second objects, and the second extension line connecting second corresponding feature points between the first and second objects; and
      determining one of linear edges detected from the image that is closest to the intersection to be a horizon in the image.

2. The method of claim 1, wherein the posture of the camera comprises a tilting angle of the camera, and
   wherein the detecting the posture of the camera comprises detecting the tilting angle of the camera based on the horizon.

3. The method of claim 1, wherein the detecting the first and second objects is performed by detecting the first object from a first frame of the image and detecting the second object from a second frame of the image, wherein the first and second frames are captured by the camera at different times.

4. The method of claim 1, wherein the detecting the first and second objects is performed by tracing the first object in the first frame and detecting the first object traced in the second frame as the second object.

5. The method of claim 1, wherein the first object is detected using a motion detecting method.

6. The method of claim 1, wherein the detecting the first and second objects is performed by a feature recognition method based on same feature values.

7. The method of claim 1, wherein the detecting the first and second objects, the detecting the first and second feature points, and the detecting the intersection are repeated a plurality of times, and
   wherein the determining the horizon is performed using a plurality of intersections obtained by the repetition.

8. The method of claim 1, wherein the camera is operated in a top-view mode to capture images of an area from an upper side of the area or in a side-view mode to capture images of the area from a lateral side of the area, and
   wherein the detecting the posture of the camera is performed by detecting a posture of the camera corresponding to the top-view mode or side-view mode of the camera.

9. The method of claim 8, wherein the acquiring the ground information comprises:
   detecting motion vectors of moving objects in the image; and
   acquiring the ground information based on a direction of the detected motion vectors.

10. The method of claim 9,
    wherein the acquiring the ground information further comprises determining whether the motion vectors have directivity, and
    wherein the acquiring the ground information further comprises determining that the posture of the camera is in the top-view mode if the motion vectors are determined as having no directivity, and determining that the posture of the camera is in the side-view mode if the motion vectors are determined as having directivity.

11. An apparatus for detecting a posture of a camera, the apparatus comprising at least one processor to implement:
    an image acquisition unit configured to acquire an image captured by the camera coupled to a vertically-rotatable tilting unit;
    a ground information acquisition unit configured to acquire information about the ground in the image; and
    a posture detection unit configured to detect the posture of the camera based on the ground information,
    wherein the ground information acquisition unit is further configured to:
       detecting a first object and a second object from the image,
       detecting an intersection between a first extension line and a second extension line, the first extension line connecting first corresponding feature points between the first and second objects, and the second extension line connecting second corresponding feature points between the first and second objects, and
       determining one of linear edges detected from the image that is closest to the intersection to be a horizon in the image.

12. The apparatus of claim 11, wherein the camera is operated in a top-view mode to capture images of an area from an upper side of the area or in a side-view mode to capture images of an area from a lateral side of the area,
    wherein the ground information acquisition unit comprises a movement line detection part configured to detect motion vectors of moving objects in the image, and
    wherein the posture detection unit detects a posture of the camera corresponding to one of the top-view mode and the side-view mode based on whether the motion vectors have directivity.

13. The apparatus of claim 12, wherein the movement line detection part detects a plurality of motion vectors, and
    wherein the ground information acquisition unit further comprises a directivity detection part configured to determine whether the motion vectors have directivity,
    wherein if the motion vectors are determined as having no directivity, the posture detection unit determines the posture of the camera as a posture corresponding to the top-view mode, and
    wherein if the motion vectors are determined as having directivity, the posture detection unit determine the posture of the camera as a posture corresponding to the side-view mode.

* * * * *